(12) United States Patent
Matsumoto

(10) Patent No.: US 6,900,859 B2
(45) Date of Patent: May 31, 2005

(54) IN-PLANE SWITCHING MODE ACTIVE MATRIX LIQUID CRYSTAL DISPLAY PANEL HAVING HIGHLY RESISTIVE LAYER INSERTED IN GAP BLACK MATRIX AND COLOR FILTERS AND PROCESS FOR FABRICATION THEREOF

(75) Inventor: Kimikazu Matsumoto, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 232 days.

(21) Appl. No.: 10/055,127

(22) Filed: Oct. 29, 2001

(65) Prior Publication Data

US 2002/0089624 A1 Jul. 11, 2002

(30) Foreign Application Priority Data

Oct. 30, 2000 (JP) .......................................... 2000-334938

(51) Int. Cl.⁷ ............................................ G02F 1/1335
(52) U.S. Cl. ....................................... 349/106; 349/138
(58) Field of Search .................................. 349/106–138

(56) References Cited

U.S. PATENT DOCUMENTS 6,224,735 B1 * 5/2001 Akutsu et al. ................ 205/91
6,310,672 B1 * 10/2001 Koioke et al. ............... 349/106
6,414,732 B1 * 7/2002 Matsumoto et al. ......... 349/106

FOREIGN PATENT DOCUMENTS

| JP | 9-269504 | 10/1997 | ........... G02F/1/136 |
| JP | 10-73810 | 3/1998 | ......... G02F/1/1335 |
| JP | 10-170958 | 6/1998 | ........... G02F/1/136 |
| JP | 2986757 | 10/1999 | ........... G02F/1/137 |

* cited by examiner

*Primary Examiner*—John Niebling
*Assistant Examiner*—Christopher Lattin
(74) *Attorney, Agent, or Firm*—Hayes Soloway P.C.

(57) ABSTRACT

An in-plane switching mode active matrix liquid crystal display panel includes a substrate structure having a black matrix defining openings and color filter layers disposed in the openings, another substrate structure formed with thin film transistors, pixel electrodes and common electrodes for generating local lateral electric fields and liquid crystal filling the gap between the substrate structures, wherein a highly resistive layer is inserted in the gap between the black matrix and the color filter layers for blocking the color filter layers from electric charges induced in the black matrix due to a potential variation on the pixel electrodes, thereby preventing the visual images from an after image and irregularity in colors.

25 Claims, 6 Drawing Sheets

IN-PLANE SWITCHING MODE ACTIVE MATRIX LIQUID CRYSTAL DISPLAY PANEL HAVING HIGHLY RESISTIVE LAYER INSERTED IN GAP BLACK MATRIX AND COLOR FILTERS AND PROCESS FOR FABRICATION THEREOF

FIELD OF THE INVENTION

This invention relates to a liquid crystal display panel and, more particularly, to an in-plane switching mode liquid crystal display panel for producing visual images on the matrix of pixels and a process for fabricating the in-plane active matrix liquid crystal display panel.

DESCRIPTION OF THE RELATED ART

An active matrix liquid crystal display panel has a matrix of pixels for producing visual images thereon. Each of the pixels includes a series combination of a thin film transistor and a pixel electrode, a piece of liquid crystal and a part of a common electrode. The thin film transistors are sequentially scanned with scanning signals so as selectively to turn on, and the selected thin film transistors pass image-carrying signals to the associated pixel electrodes. Thus, the image-carrying signals reach the selected pixel electrodes, and create local electric fields between the selected pixel electrodes and the common electrode. The pieces of liquid crystal are twisted in the local electric fields, and change the transparency. As a result, visual images are produced on the matrix of the pixels.

The active matrix liquid crystal display panel is thin, light and low power consumption, and produces a picture in good contrast between dark pixels and light pixels at high speed. Thus, the active matrix liquid crystal display panel is attractive, and, accordingly, a big demand is found for the active matrix liquid crystal display as a built-in display unit of a portable computer and a compact monitor display unit of various kinds of electronic systems.

The active matrix liquid crystal display panel is expected to achieve a high-quality image and a wide visual field. One of the approaches to the wide visual field is to make the pieces of liquid crystal twist in lateral local electric fields. A typical example of the pixel for creating the lateral local electric field is disclosed in Japanese Patent No. 2986757 as "Electrooptical Display Unit and Liquid Crystal Switch". The pixels for creating the lateral local electric fields form a liquid crystal display panel, which is usually called as "in-plane switching mode liquid crystal pixel".

FIG. 1 shows the prior art in-plane switching mode active matrix liquid crystal display panel. The prior art in-plane switching mode active matrix liquid crystal display panel largely comprises a first substrate structure, a second substrate structure and liquid crystal 107 sealed between the first substrate structure and the second substrate structure. Back light is incident on the second substrate structure, and passes through the pieces of liquid crystal so as to produce visual images on the first substrate structure. In the following description, the phrase "inner surface" is indicative of a surface of a layer closer to the liquid crystal layer than an outer surface.

The first substrate structure includes a polarizing plate 101, a transparent insulating substrate 103 and a coloring layer 105. The polarizing plate 101 is adhered to the outer surface of the transparent insulating substrate 103, and the coloring layer 105 is formed on the inner surface of the transparent insulating layer 103. A black matrix 112 and color filter layers 113 form the coloring layer 105. Although only one color filter layer 113 is shown in FIG. 1, red filter layers, green filter layers and blue filter layers are incorporated in the coloring layer 105 together with the black matrix 112. The color filter layers 113 and the black matrix are formed of synthetic resin.

The second substrate structure includes a polarizing plate 102, a transparent insulating substrate 104 and an electric field generating layer 106. The polarizing plate 102 is adhered to the outer surface of the transparent insulating substrate 104, and the electric field generating layer 106 is formed on the inner surface of the transparent insulating substrate 104. Thin film transistors (not shown), pixel electrodes 110 and common electrodes 111 are incorporated in the electric field generating layer 106. Though not shown in FIG. 1, data lines are selectively connected to the drain nodes of the thin film transistors, and scanning lines partially serve as the gate electrodes of the thin film transistors. The pixel electrodes 110 are respectively connected to the drain nodes of the thin film transistors, and are isolated from the common electrodes 111. Each of the thin film transistors, the associated pixel electrode 110, an associated part of the common electrode 111, an associated color filter layer 113 and a piece of liquid crystal 107 therebetween form one of the pixels.

The pixel electrodes 110 are arranged in parallel to the inner surface of the transparent insulating layer 104, and lateral local electric fields are selectively created between the pixel electrodes 110 and the common electrodes 111. The lateral electric field has electric lines of force laterally extending through the piece of liquid crystal 107, and the liquid crystal molecules change the directions of anisotropic axes or directors through rotation on virtual planes substantially in parallel to the inner surface of the transparent insulating substrate 104 in such a manner that the piece of liquid crystal 107 decreases the transparency to zero. Thus, the liquid crystal molecules are rotated on the virtual planes in parallel to the inner surface of the transparent insulating substrate 104 so that the prior art in-plane switching mode active matrix liquid crystal display panel achieves a wide visual field.

The lateral local electric fields are created between the pixel electrodes 110 and the common electrodes 111, and both pixel and common electrodes 110/111 are incorporated in the second substrate structure. This means that any conductive layer is not incorporated in the first substrate structure. As described hereinbefore, the black matrix 112 and the color filter layers 113 are formed on the inner surface of the transparent insulating substrate 103, and the first substrate structure is in electrically floating state. After the prior art in-plane switching mode active matrix liquid crystal display panel is operating for a certain time period, electric charges tend to be accumulated in the coloring layer 105 under the influence of potentials applied to the electrodes and the conductive lines in the second substrate structure. The electric charges cause the black matrix 112 to have a certain potential level different from the common potential level, and electric current 114 tends to flow through the color filter layers 113 as shown.

The coloring layer 105 is capacitively coupled to the pixel electrodes 110 and the common electrodes 111 through the liquid crystal 107, and the prior art in-plane switching mode active matrix liquid crystal display panel is equivalent to a circuit illustrated in FIG. 2. The black matrix 112 and the color filter layers 113 are equivalent to a series of resistors, and the series of resistors is coupled to a capacitor where the electric charges are accumulated. The series of resistors are further coupled through capacitors to the pixel electrodes 110 and the common electrodes 111, and the pixel electrodes 110 are further coupled through a capacitor to the common electrodes 111. When the potential level on the pixel electrode 110 is varied, electric charges are induced in the black matrix 112, and flow out into the color filter layers 113. The electric charges are causative of an after image, and reduces the contrast. Thus, the after image and the reduction in contrast are the problems inherent in the prior art in-plane switching mode active matrix liquid crystal display panel shown in FIGS. 1 and 2.

FIG. 3 shows the structure of a pixel incorporated in another prior art in-plane switching mode active matrix liquid crystal display panel. The prior art in-plane switching mode active matrix liquid crystal display panel is also broken down into the first substrate structure, the second substrate structure and liquid crystal. Color filter layers 8 and a black matrix 7 are formed on the inner surface of a transparent insulating substrate. On the other hand, a common electrode 23 and a scanning line (not shown) are patterned on the inner surface of a transparent insulating layer, and are covered with a gate insulating layer 25. A part of the scanning line serves as a gate electrode. A pixel electrode 24 and data lines 27D are patterned on the gate insulating layer 25. The scanning line and the data lines 27D are capacitively coupled to the black matrix 7, and electric charges are induced in the black matrix 7 due to the image-carrying signal on the data lines 27D and the scanning signal on the scanning line. The electric charges flow out from the black matrix 7 into the color filter layer 8 as shown. The electric charges in the color filter 8 gives rise to an after image, and reduces the contrast of visual images produced on the matrix of pixels.

The in-plane switching mode active matrix liquid crystal display panels shown in FIGS. 1 and 2 and FIG. 3 are a prototype, and do not work out any countermeasure against the electric charges.

A countermeasure is disclosed in Japanese Patent Application laid-open No. 10-073810. The first countermeasure is incorporated in an in-plane switching mode active matrix liquid crystal display panel, which is hereinbelow referred to as "first prior art in-plane switching mode active matrix liquid crystal display panel". The first countermeasure is to make the black matrix highly resistive. The resistivity is equal to or greater than $10^8$ ohm-cm. The highly resistive black matrix suppresses the current flowing out into the color filter layers, thereby preventing a picture produced on the pixel array from irregularity in color.

Another countermeasure is disclosed in Japanese Patent Application laid-open No. 09-269504. The countermeasure is also employed in an in-plane switching mode active matrix liquid crystal display panel, which is hereinbelow referred to as "second prior art in-plane switching mode active matrix liquid crystal display panel". The second countermeasure is to connect the conductive black matrix to the common electrode. The conductive black matrix is maintained at the potential level equal to the common electrode, and prevents the pixel array from the after image.

Although the current producing mechanism is different from the current produced in the first and second in-plane switching mode active matrix liquid crystal display panels, a countermeasure against is disclosed in Japanese Patent Application laid-open No. 10-170958. The countermeasure is employed in an in-plane switching mode active matrix liquid crystal display panel against photo-leakage current, which is produced in the presence of photo-radiation to the thin film transistor. According to the Japanese Patent Application laid-open No.10-170958, the black matrix is partially formed of pigment-dispersed resist and partially formed of aluminum. The image producing area is divided into a frame area, which is a periphery of the image producing area, and a displaying area, which is the remaining area for producing the images. The black matrix overlapped with the displaying area is formed of the pigment dispersed resist, and the black matrix overlapped with the frame area is formed of the aluminum. The aluminum black matrix does not allow the leakage light to penetrate from the frame area into the array of thin film transistors. However, the aluminum black matrix is merely effective against the current produced through the different mechanism. This means that the countermeasure disclosed in the Japanese Patent Application laid-open is not available for the electric charges induced in the black matrix due to the variation of potential on the electrodes.

A problem is encountered in the first prior art in-plane switching mode active matrix liquid crystal display panel in low photo-absorption ratio. This is because of the fact that the material available for the highly resistive black matrix can not absorb the incident light to the extent of achieving good contrast. Another problem inherent in the first prior art in-plane switching mode active matrix liquid crystal display panel is irregularity in colors and an after image produced on the pixel array. In detail, when the voltage is locally varied in the electric generating layer, the black matrix is locally influenced so as to generate the electric charge. However, the electric charges are hardly dispersed over the highly resistive black matrix. This results in the locally raised potential level in the highly resistive black matrix. The locally raised potential level is causative of the irregularity in colors and the after image produced on the pixel array. If the highly resistive black matrix is accompanied with a means for equalizing the potential level, the irregularity will be eliminated from the picture. However, the means makes the coloring layer complicated and high in production cost.

A problem inherent in the second prior art in-plane switching mode active matrix liquid crystal display panel is the complicated fabrication process. The conductive black matrix is to be exposed to the outside along the periphery of the substrate structure, and conductive columns are to be formed in order to connect the conductive black matrix to the common electrode. When the two substrate structures are assembled together, the conductive columns are to be aligned with the conductive black matrix and the common electrode. The conductive columns per se are costly, and the careful alignment work further makes the production cost high.

SUMMARY OF THE INVENTION

It is therefore an important object of the present invention to provide an in-plane switching mode active matrix liquid crystal display panel, which is good in contrast, free from the after image, poor contrast and the irregularity in colors and low in production cost.

To accomplish the object, the present invention proposes to insert a piece of highly resistive material between a black matrix and color filter layers.

In accordance with one aspect of the present invention, there is provided an active matrix liquid crystal display panel for producing visual images comprising a first substrate structure including a black matrix defining openings, color filter layers respectively disposed in the openings and a piece of material inserted between the black matrix and the color filter layers and larger in resistivity than the black matrix and the color filter layers, a second substrate structure including electrodes for selectively generating local electric fields in regions associated with the color filter layers, and a liquid crystal layer filling a gap between the first substrate structure and the second substrate structure and having pieces of liquid crystal in the regions for changing values of transparency depending upon the local electric fields.

In accordance with another aspect of the present invention, there is provided a process for fabricating an active matrix liquid crystal display panel comprising the steps of a) preparing a first substrate structure including a black matrix defining openings, color filter layers respectively disposed in the openings and a piece of material inserted between the black matrix and the color filter layers and larger in resistivity than the black matrix and the color filter layers and a second substrate structure including electrodes for generating local electric fields, b) assembling the first substrate structure and the second substrate structure together so that a gap takes place therebetween, c) injecting liquid crystal into the gap, and d) completing the active matrix liquid crystal display panel.

BRIEF DESCRIPTION OF THE DRAWINGS

The features and advantages of the liquid crystal display panel will be more clearly understood from the following description taken in conjunction with the accompanying drawings in which.

DESCRIPTION OF THE PREFERRED EMBODIMENTS

First Embodiment

Figure 1:
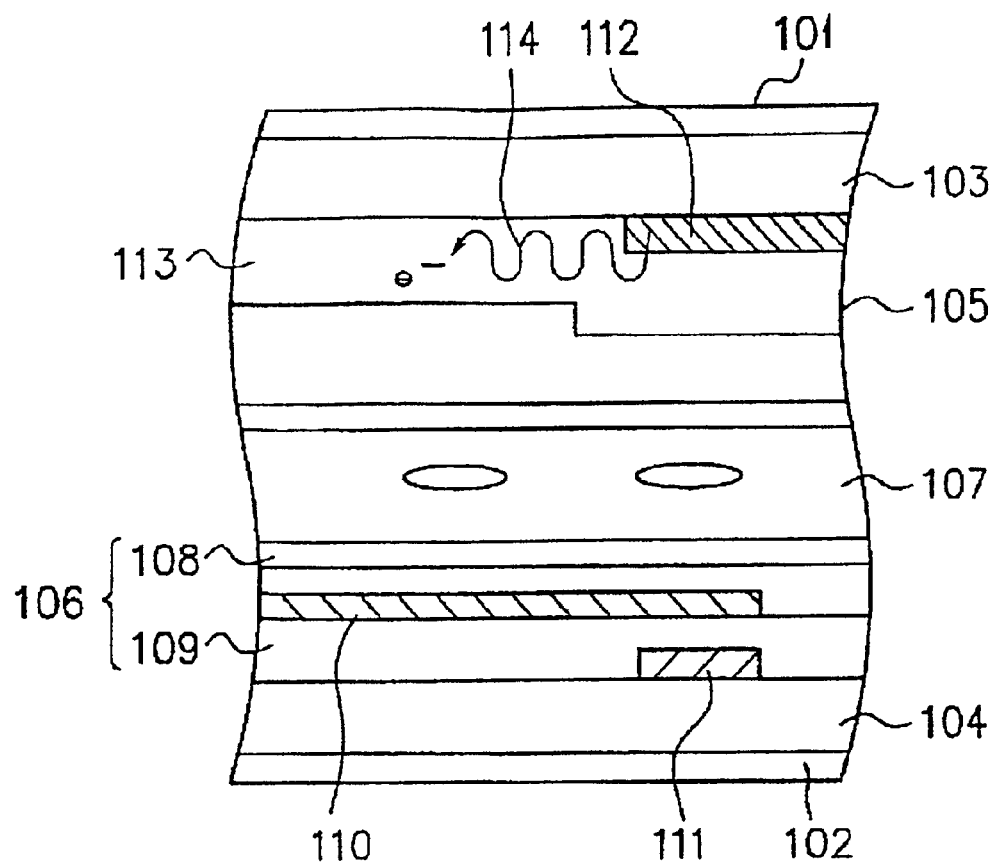
FIG. 1 is a schematic view showing the cross section of the prior art in-plane switching type liquid crystal display panel.
Figure 2:
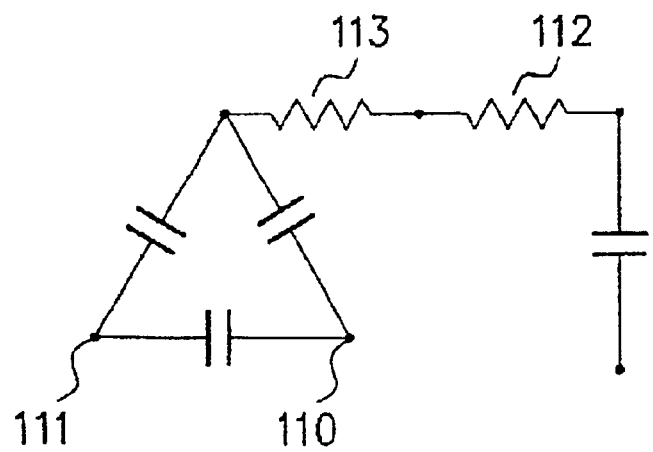
FIG. 2 is a circuit diagram showing the equivalent circuit of the prior art in-plane switching type active matrix liquid crystal display panel.
Figure 3:
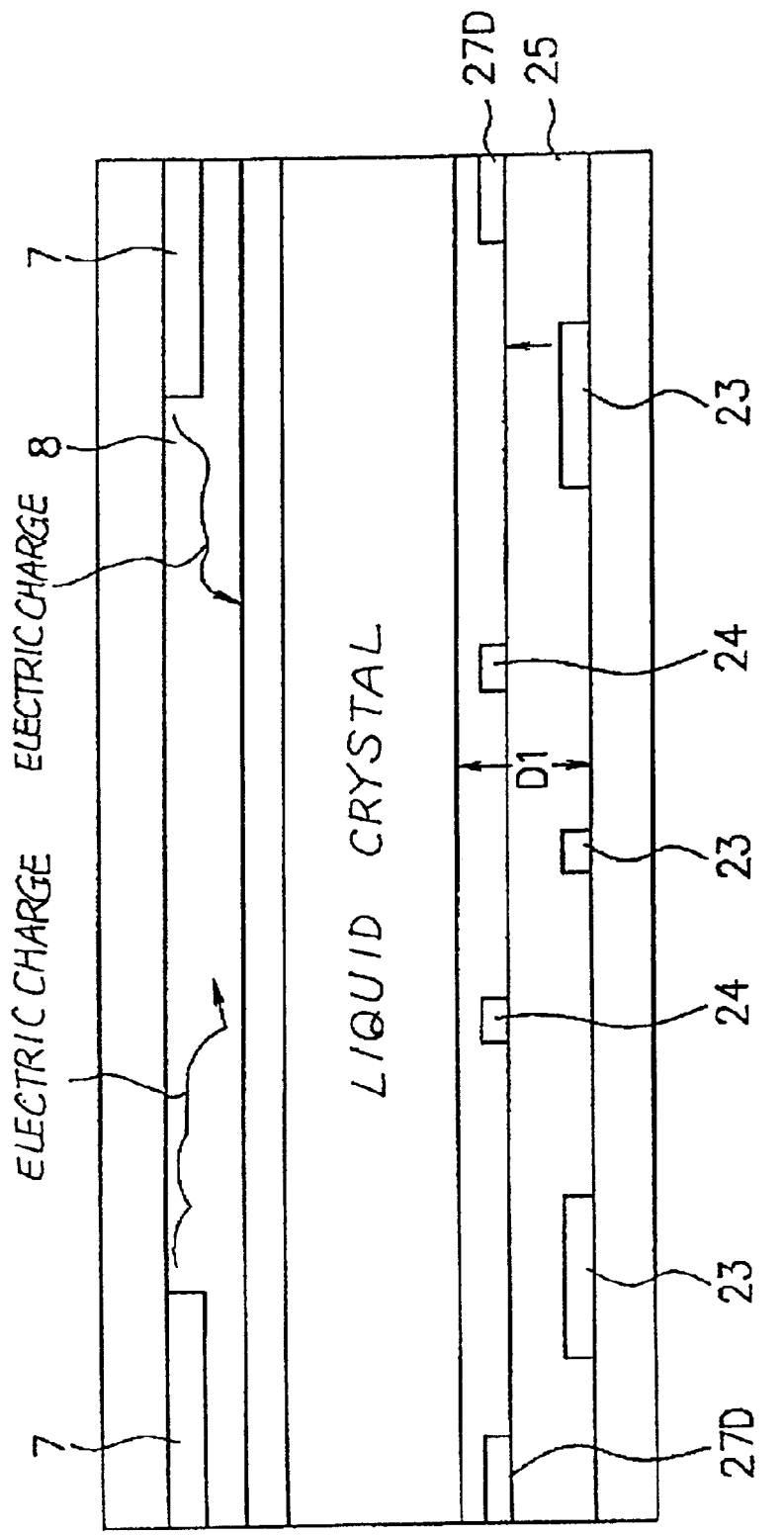
FIG. 3 is a schematic view showing the cross section of another prior art in-plane switching mode active matrix liquid crystal display panel.
Figure 4:
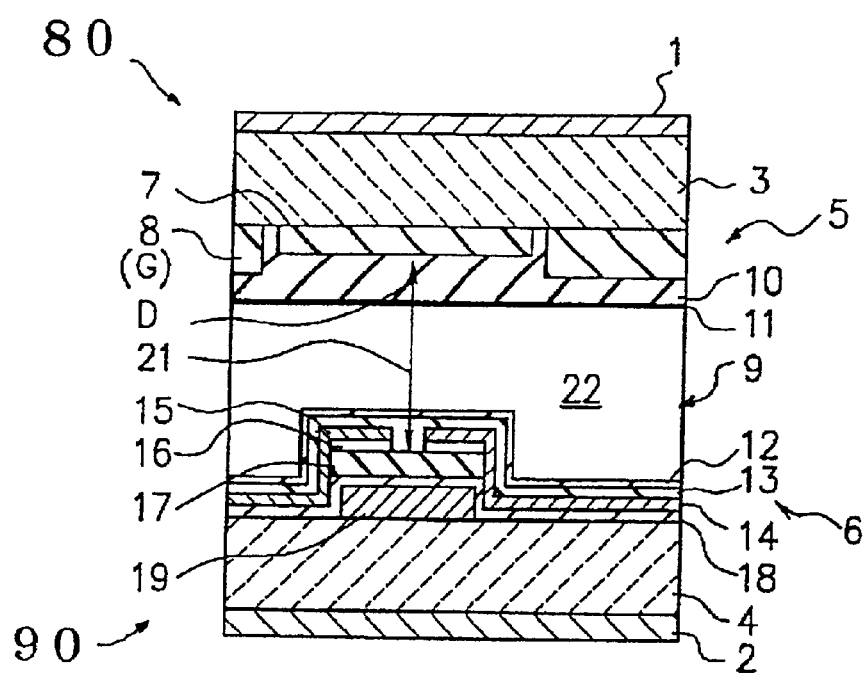
FIG. 4 is a cross sectional view showing the structure of an in-plane switching mode active matrix liquid crystal display panel according to the present invention.

Referring to FIG. 4 of the drawings, an in-plane switching mode active matrix liquid crystal display panel embodying the present invention largely comprises a first substrate structure 80, a second substrate structure 90 and liquid crystal 9 filling the gap between the first substrate structure and the second substrate structure. The second substrate structure 90 makes the liquid crystal 9 partially transparent and partially non-transparent, and the first substrate structure 80 colors the visual images.

The first substrate structure 80 includes a first polarizing plate 1, a transparent glass substrate 3, a coloring layer 5, an overcoat layer 10 and a first orientation layer 11. The first polarizing plate 1 is laminated on the outer surface of the transparent glass substrate 3, and the coloring layer 5 is formed on the inner surface of the transparent glass substrate 3. The coloring layer 5 is covered with the overcoat layer 10, and the first orientation layer 11 is laminated on the inner surface of the overcoat layer 10.

A black matrix 7 and color filter layers 8 are incorporated in the coloring layer 5. The black matrix 7 is formed with plural openings 26 (see FIG. 5), and the plural openings 26 are respectively assigned to pixels. In this sense, the word "black" means non-transparent. Light can pass through the openings 26 and a piece of liquid crystal 9 in the openings 26. However, the light can not pass through the black matrix 7. Thus, the black matrix 7 defines the pixels, and offers optical shield.

The primary three colors, i.e., red, green and blue are selectively given to the color filter layers, and the color filter layers 8 are broken down into the red filter layers, the green filter layers and the blue filter layers. The red filter layers 8, the green filter layers 8 and the blue filter layers 8 are respectively labeled with (R), (G) and (B) in the drawings. The color filters 8 are respectively assigned the openings 26, and, accordingly, form parts of the pixels, respectively. Each of the red color filters 8 form a pixel group together with associated one of the green filter layers 8 and associated one of the blue filter layers 8, and the pixel group serve as a single dot of a picture to be produced.

The black matrix 7 and the color filter layers 8 are formed on the inner surface of the transparent glass substrate 3, and the color filter layers 8 are spaced from the inner periphery of the black matrix 7 defining the openings 26. Although FIG. 4 shows two inner surfaces of the black matrix 7 spaced from the side surfaces of the two color filter layers in a certain lateral direction, the other inner surfaces of the black matrix 7 are also spaced from the other side surfaces of the two color filters in the direction perpendicular to the certain lateral direction. This means that the color filter layers 8 are never overlapped with the black matrix 7. For this reason the overcoat layer 10 penetrates into the gap between the black matrix 7 and the color filter layers 8, and intervenes between the black matrix 7 and the color filter layers 8. The insulating material for the overcoat layer 10 is larger in resistivity that the insulating material for the color filter layers 8. For this reason, current hardly flows from the black matrix 7 into the color filter layers 8. The gap between the black matrix 7 and the color filter layers 8 is less than a critical value at which the back light is leaked.

The second substrate structure 90 includes a second polarizing plate 2, a transparent glass substrate 4, an electric field generating layer 6 and a second orientation layer 12. The second polarizing plate 2 is laminated on the outer surface of the transparent glass substrate 4, and the electric field generating layer 6 is formed on the inner surface of the transparent glass substrate 4. The electric field generating layer 6 generates local electric fields, and each of the local electric fields has the electric lines of force extending through the piece 22 of liquid crystal 9 almost in parallel to the inner surface of the transparent glass substrate 4. The liquid crystal molecules around the second substrate structure 90 have respective directors almost in parallel to the inner surface of the transparent glass substrate 4. The electric field generating layer 6 is covered with the second orientation layer 12.

The electric field generating layer 6 is hereinbelow described in detail with concurrent reference to FIGS. 4, 5 and 6. Although the electric field generating layer 6 is shared among the pixels, only one pixel is shown in the figures. Description is made on one of the pixels. Since the pixels are similar in structure to one another, the following description is applicable to the other pixels.

The electric field generating layer 6 includes a scanning line 27G, a thin film transistor, a pixel electrode 24, a part of a common electrode 23 and a passivation layer 13. The thin film transistor has a gate insulating layer 18, a gate electrode 19, a channel layer 16/17, a source electrode 14 and a drain electrode 15. The gate electrode 19 is a part of the scanning line 27G, and the gate insulating layer 18 is shared with other thin film transistors.

The scanning line 27G and, accordingly, the gate electrode 19 are formed on the inner surface of the transparent glass substrate 4, and the scanning line 27G and the inner surface exposed to between the scanning lines 27G are covered with the gate insulating layer 18. A heavily doped n-type amorphous silicon layer 16 and an n-type amorphous silicon layer 17 form in combination the channel layer, and the channel layer 17 is opposed to the gate electrode 19 through the gate insulating layer 18. The channel layer 16/17 is overlapped with a part of the source electrode 14 and a part of the drain electrode 15, and the source electrode 14 is spaced from the drain electrode 15.

The pixel electrode 24, the part of common electrode 24, the thin film transistor 19/18/ 17/16/ 15/14, the piece of liquid crystal 22 and the color filter layer 8 form in combination the pixel.

Figure 5:
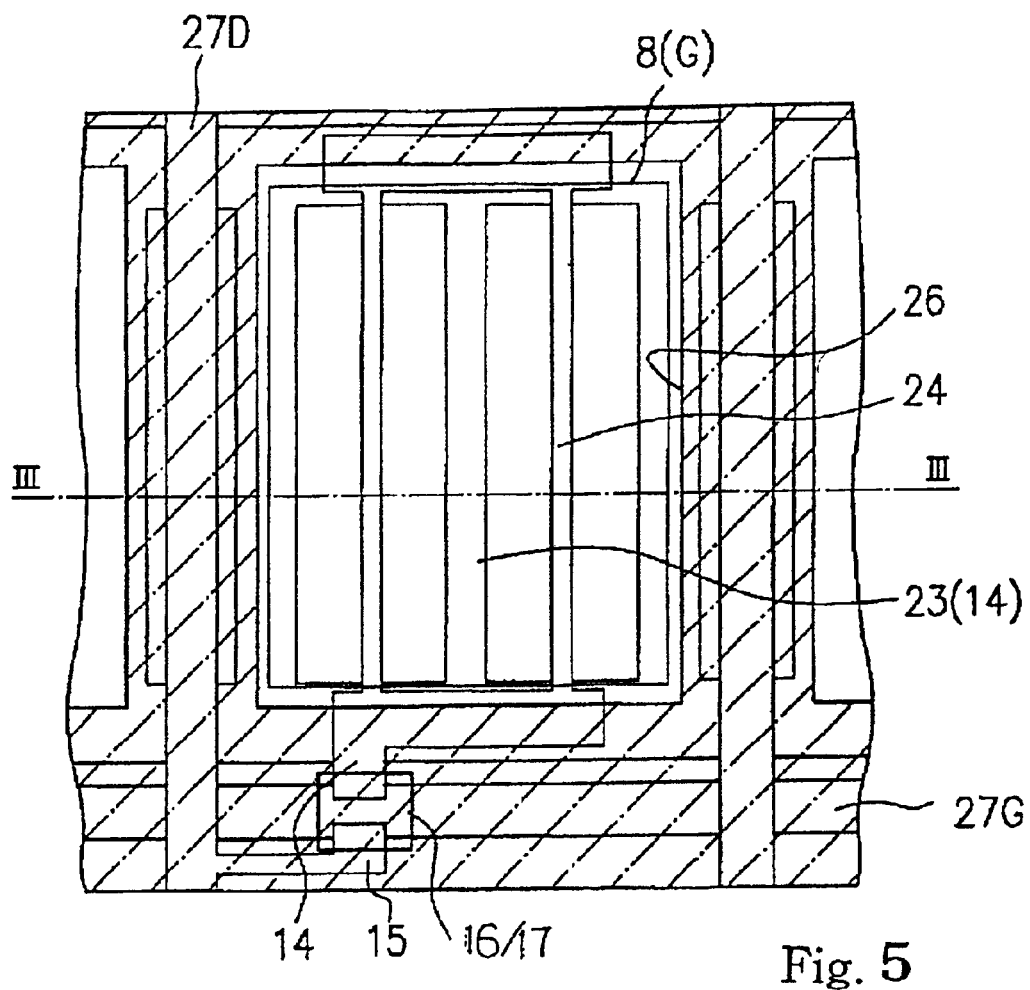
FIG. 5 is a plane view showing the arrangement of electrodes, signal lines and a color filter layer forming parts of a pixel incorporated in the in-plane switching mode active matrix liquid crystal display panel.
Figure 6:
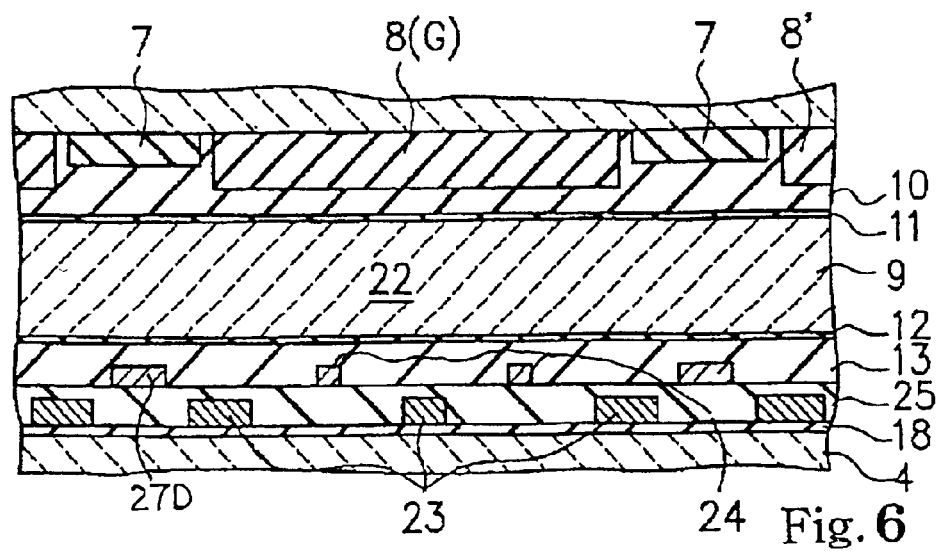
FIG. 6 is a cross sectional view taken along line III—III of FIG. 5 and showing the structure of the pixel.

As will be better seen in FIG. 5, a rectangular hollow space is formed in the pixel electrode 24, and, accordingly, the pixel electrode has a plane figure like the Roman numeral II. On the other hand, two rectangular hollow spaces are formed in the part of the common electrode 23 associated with the pixel electrode 24. The pixel electrode 24 is offset from the common electrode 24, and the electrode portions of the pixel electrode 24 extend over the hollow spaces in the common electrode 23.

When a potential difference is applied to the pixel electrode 24 and the part of the common electrode 24, the local electric field is created between the pixel electrode 24 and the part of the common electrode 24. The electric lines of force extend in the piece of liquid crystal 22 almost in parallel to the inner surface of the transparent glass substrate 4, and give rise to rotation of the virtual planes almost in parallel to the inner surface of the transparent glass substrate 4. The first and second polarizing plates 1/2 and the piece of liquid crystal 9 permit back light to pass the in-plane switching mode active matrix liquid crystal panel, and the color filter layers 8 gives the primary three colors thereto. As a result, full-color visual images are produced on the matrix of pixels. The local electric field with the electric lines of force almost in parallel to the inner surface is referred to as "lateral electric field". When the potential difference is removed from between the pixel electrode 24 and the part of the common electrode 23, the back light can not pass the optical structure of the first and second polarizing plates 1/2 and the piece of liquid crystal 22.

The remaining portion of the source electrode 14 extends on the gate insulating layer 14, and is connected to the pixel electrode 24. The remaining portion of the drain electrode 15 also extends on the gate insulating layer 18, and is connected to the data line 27D. The pixel electrode 24, the source electrode 14, the drain electrode 15, the data line 27D and the exposed surface of the gate insulating layer 18 are covered with the second orientation layer 12.

The black matrix 7 has the photo-shield portions arranged like a lattice. The scanning lines 27G and the thin film transistors 19/18/ 17/16/ 15/14 are overlapped with the photo-shield portions extending in a certain direction, and the data lines 27D are overlapped with the remaining photo-shield portions extending in the perpendicular direction. Thus, the scanning lines 27G, the data lines and the thin film transistors are optically shielded by the black matrix 7.

The first and second orientation layers 11/12 were subjected to a rubbing in a direction oblique to the certain direction, and, accordingly, the liquid crystal molecules in the vicinity of the orientation layers 11/12 are oriented in the direction oblique to the certain direction.

The in-plane switching mode active matrix liquid crystal display panel behaves as follows. The pixel shown in FIGS. 4, 5 and 6 is assumed to be expected to make the light green. First, the scanning line 27G is changed to an active level, and causes the thin film transistor 18/17/ 16/15/ 14 to turn on. Then, the data line 27D is electrically connected through the thin film transistor 18/17/ 16/15/ 14 to the pixel electrode 24. An image carrying signal is propagated through the data line 27D to the drain electrode 15, and reaches the pixel electrode 24. Then, the potential difference takes place between the pixel electrode 24 and the part of the common electrode 23. The lateral electric field is generated, and gives rise to the rotation of the liquid crystal molecules. The pixel permits the back light to pass, and the color filter layer 8(G) makes the back light green. Thus, the pixel is colored in green. When the scanning line 27G is recovered to the inactive level, the lateral electric field is removed from the piece of liquid crystal 22, and the liquid crystal molecules are oppositely rotated. The back light can not pass the pixel, and the green light is extinguished.

The scanning line 27G and the data line 27D are varied in potential level due to the scanning signal and the image-carrying signal, and, accordingly, the gate electrode 19 and the pixel electrode 24 are varied in potential level. The variation of potential level gives rise to inducing electric charges in the black matrix 7. However, the highly resistive overcoat layer 10 intervenes between the black matrix 7 and the color filter layers 8. The overcoat layer 10 prevents the color filter layers 8 from the electric charge, and any current does not flow over the color filter layers 8. Any after image is not produced on the matrix of pixels, and great contrast is achieved in the visual images. Moreover, the irregularity in colors does not take place in the visual images.

Second Embodiment

Figure 7:
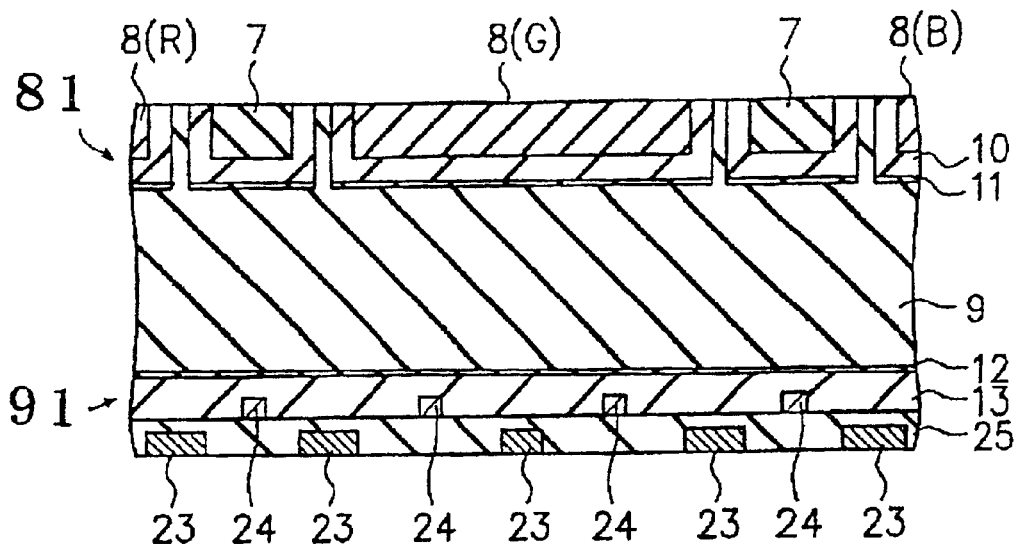
FIG. 7 is a cross sectional view showing the structure of another in-plane switching mode active matrix liquid crystal display panel according to the present invention.

Turning to FIG. 7 of the drawings, another in-plane switching mode active matrix liquid crystal display panel embodying the present invention also largely comprises a first substrate structure 81, a second substrate structure 91 and liquid crystal 9 filling the gap between the first substrate structure 81 and the second substrate structure 91.

Though not shown in FIG. 7, a first polarizing plate is laminated on the outer surface of a first transparent glass substrate, and a second polarizing plate is laminated on the outer surface of a second transparent glass substrate as similar to those of the in-plane switching mode active matrix liquid crystal display panel implementing the first embodiment. A coloring layer is formed on the inner surface of the first transparent glass substrate, and an electric field generating layer is laminated on the inner surface of the second transparent glass substrate. The coloring layer is covered with an overcoat layer 10, which in turn is covered with a first orientation layer 11.

The coloring layer includes a black matrix 7 and color filter layers 8(R), 8(G) and 8(B), and the black matrix 7 and the color filter layers 8(R), 8(G) and 8(B) are directly patterned on the inner surface of the first transparent substrate. The black matrix 7 is formed with plural openings, and the color filter layers 8(R), 8(G) and 8(B) are placed in the openings, respectively. The color filter layers 8(R), 8(G) and 8(B) are spaced from the inner surfaces of the black matrix 7, and the overcoat layer 10 penetrates into the gap between the color filter layers 8(R), 8(G) and 8(B) and the black matrix 7. Plural moats are formed in the overcoat layer 10. Each of the color filter layers 8(R)/8(G)/8(B) is encircled with one of the plural moats, and the inner surface of the first transparent substrate serve as the bottom surfaces of the plural moats. For this reason, the liquid crystal 9 penetrates into the plural moats. Thus, the liquid crystal 9 and the overcoat layer 10 intervenes between the black matrix 7 and the color filter layers 8(R)/8(G)/8(B). However, the leakage light is not serious.

The electric field generating layer is similar in structure to the electric field generating layer 6, and electrodes and layers incorporated therein are labeled with the references designating corresponding electrodes and layers of the electric field generating layer 6. The electric field generating layer creates the lateral local electric fields as similar to that of the first embodiment, and is covered with the second orientation layer 12.

The overcoat layer 10 is larger in resistivity than the color filter layers 8(R), 8(G) and 8(B), and the liquid crystal 9 is much larger in resistivity than the color filters 8(R), 8(G) and 8(B). The color filter layers 8(R)/8(G)/8(B) are spaced from the black matrix 7, and the piece of the overcoat layer 10 and the piece of liquid crystal 9 offer a large resistance against the electric current flowing out from the black matrix 7. However, a small amount of electric charges flows into the overcoat layer 10 between the black matrix 7 and the moats. For this reason, the potential level on the black matrix is not locally raised. Any after image, the irregularity in colors and poor contrast are not observed by virtue of the large resistance. The resistance against the electric charge is also to be fallen within the proper range.

Third Embodiment

Figure 8:
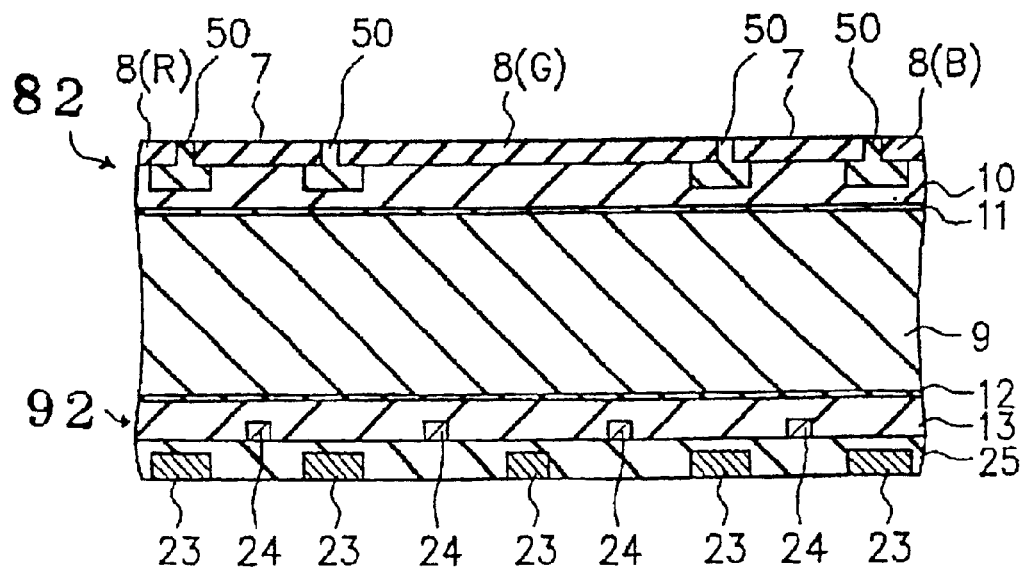
FIG. 8 is a cross sectional view showing the structure of yet another in-plane switching mode active matrix liquid crystal display panel according to the present invention.

Turning to FIG. 8 of the drawings, yet another in-plane switching mode active matrix liquid crystal display panel embodying the present invention largely comprises a first substrate structure 82, a second substrate structure 92 and liquid crystal 9 filling the gap between the first substrate structure 82 and the second substrate structure 92. The first transparent glass substrate, the second transparent glass substrate, the first polarizing plate and the second polarizing plate are omitted from FIG. 8 for the sake of simplicity.

The second substrate structure 92 is similar in structure to those of the first and second embodiments, and the first substrate structure 82 is different from the first substrate structure 80 in that an insulating layers 50 are inserted into the gaps between the black matrix 7 and the color filter layers 8(R), 8(G) and 8(B). It is preferable that the peripheral regions of the color filters 8(R), 8(G) and 8(B) and the peripheral region of the black matrix 7 are overlapped with the insulating layers 50. The insulating layers 50 are non-transparent, and are larger in resistivity than the black matrix and the color filter layers 8(R), 8(G) and 8(B). As a result, the resistance between the black matrix 7 and the color filter layers 8(R), 8(G) and 8(B) is fallen within the range. By virtue of the large resistance of the insulating layers 50, an after image, the irregularity in colors and poor contrast are not observed.

Fourth Embodiment

Figure 9:
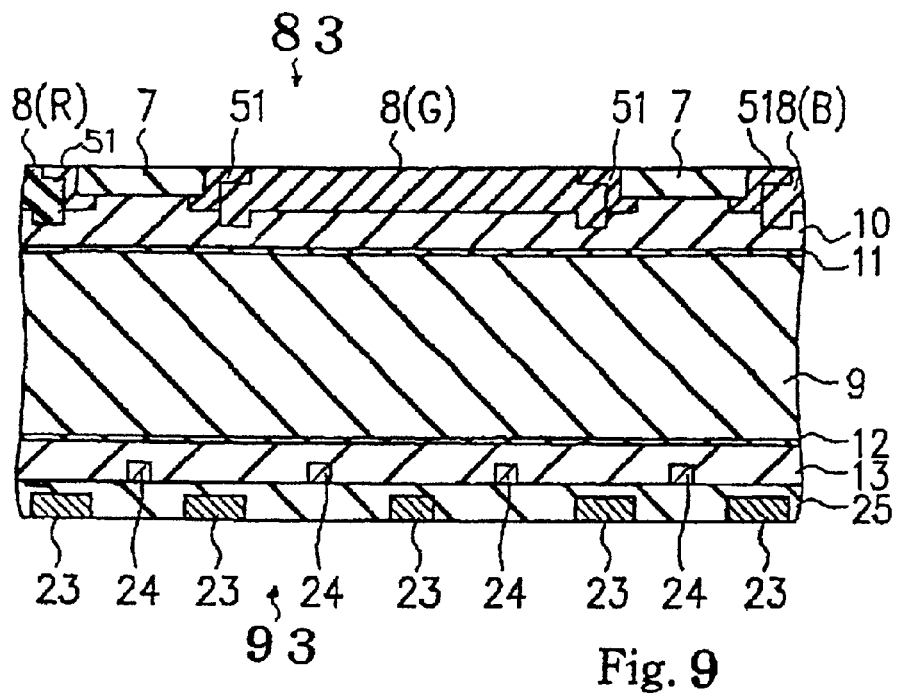
FIG. 9 is a cross sectional view showing the structure of still another in-plane switching mode active matrix liquid crystal display panel according to the present invention.

Turning to FIG. 9 of the drawings, still another in-plane switching mode active matrix liquid crystal display panel embodying the present invention largely comprises a first substrate structure 83, a second substrate structure 93 and liquid crystal 9 filling the gap between the first substrate structure 83 and the second substrate structure 93. The first transparent glass substrate, the second transparent glass substrate, the first polarizing plate and the second polarizing plate are omitted from FIG. 9 for the sake of simplicity.

The second substrate structure 93 is similar in structure to those of the first, second and third embodiments, and the first substrate structure 83 is different from the first substrate structure 80 in that an insulating layers 51 is provided in the gap between the black matrix 7 and the color filter layers 8(R), 8(G) and 8(B). The insulating layers 51 are non-transparent, and highly resistive. The insulating layers 51 are formed in the openings, and the peripheral regions of the black matrix 7 are overlapped with the insulating layers 51. The color filter layers 8(R), 8(G) and 8(B) are formed on the inner surface of the transparent glass substrate, and the insulating layers 51 are overlapped with the peripheral portions of the color filter layers 8(R), 8(G) and 8(B). The insulating layer 51 is larger in resistivity than the black matrix 7 and the color layers 8(R), 8(G) and 8(B). The insulating layer 51 offers a large resistance against electric charges induced in the black matrix 7. For this reason, an after image and poor contrast are never observed in the in-plane switching mode active matrix liquid crystal display panel.

The in-plane switching mode active matrix liquid crystal display panel implementing the fourth embodiment is more preferable rather than the in-plane switching mode active matrix liquid crystal display panel implementing the third embodiment. In the process for the in-plane switching mode active matrix liquid crystal display panel implementing the third embodiment, the black matrix 7 and the color filter layers 8(R), 8(G) and 8(B) are pattern on the inner surface of the first transparent glass substrate, and, thereafter, the insulating layer 50 is patterned. On the other hand, in the process for the in-plane switching mode active matrix liquid crystal display panel implementing the fourth embodiment, the black matrix 7 is firstly patterned on the inner surface of the first transparent glass substrate, and, thereafter, the dielectric layer 51 is patterned. Finally, the color filter layers 8(R), 8(G) and 8(B) are pattern. If the pattern of the color filter layers 8(R), 8(G) and 8(B) are deviated from the target positions, the color filter layers 8(R), 8(G) and 8(B) are held in contact with the black matrix 7 in the in-plane switching mode active matrix liquid crystal display panel implementing the third embodiment. Meanwhile, the insulating layer 51 is always inserted between the black matrix 7 and the color filter layers 8(R), 8(G) and 8(B) in the in-plane switching mode active matrix liquid crystal display panel implementing the fourth embodiment. Thus, the insulating layer 51 offers a wide margin to the manufacturer.

Fifth Embodiment

Figure 10:
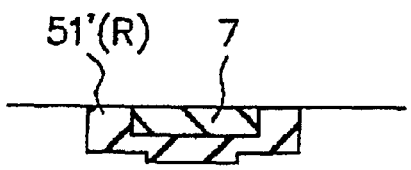
FIG. 10 is a cross sectional view showing a dielectric layer perfectly covering a black matrix incorporated in another in-plane switching mode active matrix liquid crystal display panel according to the present invention.

An in-plane switching mode active matrix liquid crystal display panel implementing the fifth embodiment is similar to the in-plane switching mode active matrix liquid crystal display panel implementing the fourth embodiment except that the insulating layers adjacent to one another are merged into an insulating layer 51'(R) as shown in FIG. 10. The insulating layer 51'(R) is non-transparent, and is highly resistive. The insulating layer 51'(R) offers a large resistance against electric charges induced in the black matrix 7, and any after image and poor contrast are not observed.

Countermeasure Against Leakage Light

In the above-described embodiments, the color filter layers 8 are spaced from the black matrix 7. In order to prevent the visual images from the light leaked through the gap between the color filter layers 8 and the black matrix 7, the following countermeasure may be employed in the in-plane switching mode active matrix liquid crystal display panel.

The first countermeasure is to form a wide non-transparent layer in the second substrate structure. The data lines 27D and the scanning lines 27G may be widened in such a manner as to be wider than the black matrix 7. The data lines 27D and the scanning lines 27G block the array of pixels from the leakage light.

The liquid crystal has the resistivity equal to or greater than $10^{13}$ ohm-cm in the above-described embodiments. The difference of phase rotational angle Δnd is the product between the thickness d of the liquid crystal and the anisotropy of refractive index Δn, and the difference of phase rotational angle And is fallen within the range between 0.2 micron and 0.36 micron, i.e., 0.2 $\mu$m<Δnd <0.36 $\mu$m. When the non-transparent layer is designed, these properties of the liquid crystal are taken into account.

Figure 11:
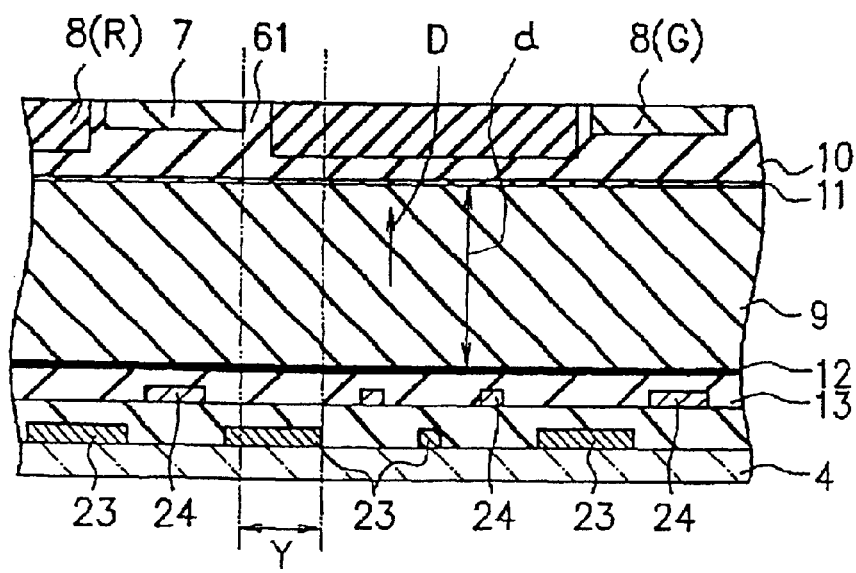
FIG. 11 is a cross sectional view showing the structure of an in-plane switching mode active matrix liquid crystal display panel according to the present invention.

FIG. 11 shows the common electrode 23 partially widened in such a manner as to block the array of pixels from the leakage light. The color filter layers such as 8(R) and 8(G) are spaced from the black matrix 7, and the gap 61 takes place therebetween. Reference "D" is indicative of the direction perpendicular to the inner surfaces of the transparent glass substrates, and the gap between the first substrate structure and the second substrate structure, i.e., the thickness of the liquid crystal is labeled with reference "d". The common electrode 23 under the gap 61 is non-transparent and widened. The wide portions of the common electrode 23 are partially overlapped with the black matrix 7 and partially overlapped with the color filter layer 8(R)/8(G). Although the wide portions of the common electrode 23 are non-transparent to the leakage light passing through the gap 61, they are also non-transparent to the light passing through the color filters 8(R)/8(G). If the distance Y is too wide, the wide portions of the common electrode 23 are causative of a low aperture ratio. However, if the ratio of thickness d to the distance Y is greater than 1 and less than 7, i.e., 1<d/Y<7, the wide portions of the common electrode 23 are ignoreable. Especially, when the thickness of liquid crystal 9 is of the order of 5 micron, the distance Y is to be 2 microns, then the wide portions of the common electrode 23 can prevent the pixel array from the leakage light without reduce the brightness.

EXAMPLES

The present inventor fabricated samples of the in-plane switching mode active matrix liquid crystal display panel, and evaluated the samples. The resistivity of the liquid crystal used in the samples was equal to or greater than $10^{13}$ ohm-cm.

The first sample had the structure of the in-plane switching mode active matrix liquid crystal display panel implementing the first embodiment. The black matrix 7 had the resistivity ranging from $10^3$–$10^6$ ohm-cm, the resistivity of the color filter layers 8 ranged from $10^8$–$10^{12}$ ohm-cm, and the overcoat layer 10 was equal in resistivity to or greater than $10^{14}$ ohm-cm.

The second sample had the structure of the in-plane switching mode active matrix liquid crystal display panel implementing the third embodiment. The black matrix 7 had the resistivity same as that of the first sample, and ranged from $10^3$–$10^6$ ohm-cm. The resistivity of the color filter layers 8(R), 8(G) and 8(B) respectively ranged from $10^{10}$–$10^{12}$ ohm-cm, $10^9$–$10^{11}$ ohm-cm and $10^8$–$10^{12}$ ohm-cm. The overcoat layer 10 was equal in resistivity to or greater than $10^{14}$ ohm-cm, and the resistivity of the dielectric layer 50 was equal to or greater than $10^{14}$ ohm-cm.

The present inventor further fabricated a comparative sample of the prior art in-plane switching mode active matrix liquid crystal display panel. The black matrix 112 was formed of the same material as those of the first and second samples, and the color filter layers 113 were also formed of the same material as those of the first and second samples.

The present inventor produced visual images on the first and second samples and the comparative sample, and observed to see whether or not any after image was produced. Moreover, the present inventor observed the visual images for the contrast. Any after image was not observed in the first and second samples, and the contrast was good. Moreover, the irregularity in colors did not take place in the visual images. However, after-images were observed in the comparative sample, and the contrast was poor. The irregularity in colors was observed in the comparative sample. Thus, the present inventor confirmed the advantages of the countermeasures according to the present invention.

Fabrication Process

The in-plane switching mode active matrix liquid crystal display panel according to the present invention is fabricated as follows. The fabrication process starts with preparation of the transparent glass substrates 3/4. The first substrate structure and the second substrate structure are fabricated on the transparent glass substrates 3/4, respectively. The two substrate structures may be fabricated in parallel. Otherwise, the first substrate structure is fabricated after the second substrate structure or vice versa.

The black matrix 7 is patterned on the inner surface of the transparent glass substrate 3, and the inner surface is exposed to the openings. One kind of the color filter layers 8(R), 8(G) and 8(B) are patterned in the opening, another kind of the color filter layers 8(R), 8(G) and 8(B) are patterned in other openings, and the remaining kind of the color filter layers 8(R), 8(G) and 8(B) are patterned in the remaining openings. The color filter layers 8(R), 8(G) and 8(B) are spaced from the black matrix 7, and the gap takes place between the color filter layers 8(R), 8(G) and 8(B) and the black matrix 7.

Subsequently, the insulating material is spread over the entire surface of the structure, and forms the overcoat layer 10. The insulating material penetrates into the gap between the color filter layers 8(R), 8(G) and 8(B) and the black matrix 7, and the black matrix 7 and the color filter layers 8(R), 8(G) and 8(B) are covered with the overcoat layer 10. Finally, the overcoat layer 10 is overlaid by the orientation layer 11.

On the other hand, the scanning lines 27G, the common electrode 23, the gate insulating layer 18, the amorphous silicon layers 16/17, the data lines 27D and the drain, source and pixel electrodes 14/15/24 are formed and patterned over the transparent glass substrate 4 as similar to those of the prior art in-plane switching mode active matrix liquid crystal display panel. The resultant structure is covered with the passivation layer 13, and the passivation layer 13 is overlaid by the orientation layer 12.

Spacers are scattered, and a sealing layer is spread along the periphery of the substrate structure. The first substrate structure and the second substrate structure are assembled together, and the liquid crystal is injected into the gap between the first substrate structure and the second substrate structure. The polarizing plates are attached to the outer surfaces of the transparent glass substrates 3/4. Thus, the in-plane switching mode active matrix liquid crystal display panel according to the present invention is completed.

The first substrate structure may be fabricated as follows. When the overcoat layer 10 is overlaid by the orientation layer 11, an etching mask is prepared on the orientation layer 11. The orientation layer 11 and the overcoat layer 10 are selectively etched so that the inner surface of the transparent glass substrate 3 is exposed to the moats. When the liquid crystal is injected into the gap between the first substrate structure and the second substrate structure, the liquid crystal fills the moats, and the in-plane switching mode active matrix liquid crystal display panel shown in FIG. 7 is obtained.

In yet another process, when the black matrix 7 and the color filter layers 8 are patterned on the inner surface of the transparent glass substrate 3, the dielectric material is deposited over the entire surface of the resultant structure. The dielectric material fills the gap between the black matrix 7 and the color filter layers 8, and swells into a dielectric layer over the black matrix 7 and the color filter layers 8. An etching mask is prepared on the dielectric material layer, and the dielectric material layer is selectively etched away. As a result, the dielectric layer 50 is formed as shown in FIG. 8.

In still another process, the black matrix 7, the color filter layers 8 and the dielectric layer 51 are patterned as follows. When the black matrix 7 is patterned on the inner surface of the transparent glass substrate 3, the dielectric material is deposited over the entire surface of the resultant structure so as to form a dielectric material layer. An etching mask is prepared on the dielectric material layer, and the dielectric material layer is selectively etched so as to form the dielectric material layer into the dielectric layer 51. Thereafter, the three kinds of the color filter layers 8(R), 8(G) and 8(B) are successively patterned as shown in FIG. 9.

As will be appreciated from the foregoing description, a piece of highly resistive material is inserted between the black matrix and the color filter layers in the in-plane switching mode active matrix liquid crystal display panel according to the present invention. The piece of highly resistive material offers an appropriate resistance against the electric charges induced in the black matrix due to the potential variation on the electrodes incorporated in the opposite substrate structures. This results in that any after image is not produced and that the visual images are produced in good contrast. The irregularity in colors is not observed in the visual images.

Some color filter layers are causative of the irregularity in colors. The color filters may be employed in an in-plane switching mode active matrix liquid crystal display panel. In this instance, even when the resistivity of liquid crystal is varied, the brightness returns to a certain value within a short time. However, the irregularity in colors due to the induced electric charges is different from the phenomenon due to the variation in resistivity of the liquid crystal. The countermeasures according to the present invention is effective against the irregularity in colors due to the induced electric charges.

Although particular embodiments of the present invention have been shown and described, it will be apparent to those skilled in the art that various changes and modifications may be made without departing from the spirit and scope of the present invention.

For example, the overcoat layer 10 may be eliminated from the first substrate structure 82.

What is claimed is:

1. An active matrix liquid crystal display panel for producing visual images, said display panel comprising a first substrate structure and a second substrate structure, and a liquid crystal layer filling a gap between the first substrate structure and the second substrate structure, wherein:

a first substrate structure including a black matrix defining openings, color filter layers respectively disposed entirely in said openings with a portion of a material inserted between said black matrix and said color filter layers, said material having a larger resistivity than said black matrix and said color filter layers;

a second substrate structure including electrodes for selectively generating local lateral electric fields in a plane parallel to the liquid crystal layer in regions associated with said color filter layers; and a liquid crystal layer has a portion of the liquid crystal in said regions for changing values of transparency depending upon the local electric fields.

2. The active matrix liquid crystal display panel as set forth in claim 1, wherein said first substrate structure further includes an overcoat layer partially covering said black matrix and said color filter layers and partially serving as said material.

3. The active matrix liquid crystal display panel as set forth in claim 2, wherein the resistivity of said color filter layers is greater than the resistivity of said black matrix and less than the resistivity of said overcoat layer.

4. The active matrix liquid crystal display panel as set forth in claim 3, wherein when said resistivity of said black matrix is within a range between $10^3$ ohm-cm to $10^6$ ohm-cm and the resistivity of said color filter layers is within a range between $10^8$ ohm-cm to $10^{12}$ ohm-cm, the resistivity of said overcoat layer is equal to or greater than $10^{14}$ ohm-cm.

5. The active matrix liquid crystal display panel as set forth in claim 2, wherein moats are formed in the part of said overcoat layer in such a manner as to be filled with said liquid crystal.

6. The active matrix liquid crystal display panel as set forth in claim 5, wherein the resistivity of said color filter layers is greater than the resistivity of said black matrix and less than the resistivity of said overcoat layer, and the resistivity of said liquid crystal is greater than the resistivity of said overcoat layer.

7. The active matrix liquid crystal display panel as set forth in claim 1, wherein said first substrate structure further includes an overcoat layer covering said black matrix, said color filter layers and said material, and wherein said material is different from said overcoat layer.

8. The active matrix liquid crystal display panel as set forth in claim 7, wherein the resistivity of said color filter layers is greater than the resistivity of said black matrix and less than the resistivity of said material and the resistivity of said overcoat layer.

9. The active matrix liquid crystal display panel as set forth in claim 8, wherein when said resistivity of said black matrix is within a range between $10^3$ ohm-cm to $10^6$ ohm-cm, and the resistivity of said color filter layers is within a range between $10^8$ ohm-cm to $10^{12}$ ohm-cm, the resistivity of said material is equal to or greater than $10^{14}$ ohm-cm, and the resistivity of said overcoat layer is equal to or greater than $10^{14}$ ohm-cm.

10. The active matrix liquid crystal display panel as set forth in claim 7, wherein said material has first portions in said gap between said black matrix and said color filter layers, second portions on the peripheral portions of said black matrix and third portions on the peripheral portions of said color filter layers.

11. The active matrix liquid crystal display panel as set forth in claim 7, wherein said material has first portions in said gap between said black matrix and said color filter layers, second portions on the peripheral portions of said black matrix and third portions overlaid by peripheral portions of said color filter layers.

12. The active matrix liquid crystal display panel as set forth in claim 7, wherein exposed surfaces of said black matrix are covered with said material.

13. The active matrix liquid crystal display panel as set forth in claim 1, wherein said second substrate structure further includes a non-transparent layer opposing the gap between said black matrix and said color filter layers so as to stop leakage light passing through said gap.

14. The active matrix liquid crystal display panel as set forth in claim 13, wherein said non-transparent layer is selected portions of a common electrode serving as selected ones of said electrodes together with pixel electrodes.

15. A process for fabricating an active matrix liquid crystal display panel, comprising the steps of:
   a) preparing a first substrate structure including a black matrix defining openings, color filter layers respectively disposed entirely in said openings and a portion of a material inserted between said black matrix and said color filter layers and larger in resistivity than said black matrix and said color filter layers and a second substrate structure including electrodes for generating local electric fields;
   b) assembling said first substrate structure and said second substrate structure together so that a gap takes place therebetween;
   c) injecting liquid crystal into said gap; and
   d) completing said active matrix liquid crystal display panel.

16. The process as set forth in claim 15, wherein said step a) includes the sub-steps of
   a-1) patterning a first material layer into said black matrix,
   a-2) patterning a second material layer into said color filter layers in such a manner that said black matrix is spaced from said color filter layers, and
   a-3) covering said black matrix and said color filter layers with an overcoat layer so that a part of said overcoat layer penetrates into the gap between said black matrix and said color filter layers for serving as said material.

17. The process as set forth in claim 15, wherein said step a) further includes the sub-step of a-4) forming moats in said part of said overcoat layer.

18. The process as set forth in claim 15, wherein said step a) includes the sub-steps of
   a-1) patterning a first material layer into said black matrix,
   a-2) patterning a second material layer into said color filter layers in such a manner that said black matrix is spaced from said color filter layers,
   a-3) patterning a third material layer into said material filling the gap between said black matrix and said color filter layers, and
   a-4) coating said black matrix, said color filter layers and said material with an overcoat layer.

19. The process as set forth in claim 15, wherein said step a) includes the sub-steps of
   a-1) patterning a first material layer into said black matrix having openings,
   a-2) forming said portion of a material in such a manner as to partially on peripheral regions of said black matrix and partially in peripheral zones of said openings,
   a-3) forming a second material layer into said color filter layers in such a manner as to have peripheral portions on the portions of said portion of a material in said peripheral zones, and
   a-4) covering said black matrix, said color filter layers and portion of a material with an overcoat layer.

20. An active matrix liquid crystal display panel for producing visual images, said display panel comprising a first substrate structure and a second substrate structure, and a liquid crystal layer filling a gap between the first substrate structure and the second substrate structure, wherein:
   said first substrate structure includes a black matrix defining openings, color filter layers respectively disposed in said openings with a portion of a material inserted between said black matrix and said color filter layers, said material having a larger resistivity than said black matrix and said color filter layers;
   said second substrate structure includes electrodes for selectively generating local lateral electric fields in a plane parallel to the liquid crystal layer in regions associated with said color filter layers; and
   said liquid crystal layer has a portion of the liquid crystal in said regions for changing values of transparency depending upon the local electric fields,
   wherein said first substrate structure further includes an overcoat layer covering said black matrix said color filter layers and said material, and wherein said material is different from said overcoat layer.

21. The active matrix liquid crystal display panel as set forth in claim 20, wherein the resistivity of said color filter layers is greater than the resistivity of said black matrix and less than the resistivity of said material and the resistivity of said overcoat layer.

22. The active matrix liquid crystal display panel as set forth in claim 21, wherein when said resistivity of said black matrix is within a range between $10^3$ ohm-cm to $10^6$ ohm-cm and the resistivity of said color filter layers is within a range between $10^8$ ohm-cm to $10^{12}$ ohm-cm, the resistivity of said material is equal to or greater than $10^{14}$ ohm-cm, and the resistivity of said overcoat layer is equal to or greater than $10^{14}$ ohm-cm.

23. The active matrix liquid crystal display panel as set forth in claim 20, wherein said material has first portions in said gap between said black matrix and said color filter layers, second portions on the peripheral portions of said black matrix and third portions on the peripheral portions of said color filter layers.

24. The active matrix liquid crystal display panel as set forth in claim 20, wherein said material has first portions in said gap between said black matrix and said color filter layers, second portions on the peripheral portions of said black matrix and third portions overlaid by peripheral portions of said color filter layers.

25. The active matrix liquid crystal display panel as set forth in claim 20, wherein exposed surfaces of said black matrix are covered with said material.

* * * * *